United States Patent [19]

Allen

[11] 4,122,008
[45] Oct. 24, 1978

[54] FILTRATION PROCESS FOR SEPARATING PARTICLES FROM LIQUID COOLANTS IN LENS GRINDING DEVICES

[76] Inventor: Eddy Allen, 640 Willow Heights, Atlanta, Ga. 30328

[21] Appl. No.: 767,631

[22] Filed: Feb. 10, 1977

[51] Int. Cl.² .............................................. B01D 29/12
[52] U.S. Cl. ........................................ 210/65; 51/267; 210/167; 210/195 S; 210/196; 210/197
[58] Field of Search ...................... 210/65, 70, 71, 153, 210/167, 168, 171, 172, 175, 177, 181, 194, 195 R, 195 S, 196, 197, 483, 499, 500 R, 507; 51/267, 270; 184/6.24, 6.14

[56] References Cited

U.S. PATENT DOCUMENTS

| 3,419,151 | 12/1968 | Smith et al. | 210/499 |
| 3,651,607 | 3/1972 | Lee | 210/167 |
| 3,785,970 | 1/1974 | Hodgkins | 210/499 |

OTHER PUBLICATIONS

"Cerex"; Monsanto Publication 7-267-1074.
"Reemay, for Filtration"; Monsanto Publication E-07383.

*Primary Examiner*—Frank Sever
*Attorney, Agent, or Firm*—Sherman & Shalloway

[57] ABSTRACT

A process for separating fine particles entrained in the liquid coolant of lens generating or edging device comprising passing the contaminated coolant through a filter medium made of a non-woven fabric comprising synthetic filaments having a denier of from about 3.5 to about 5.0; the fabric having a density of from about 0.3 to 2.0 oz. per square yard, the reduction in liquid coolant flow rate caused by the filter medium being less than about 1.0%. The present invention is effective in removing about 97% to 99% of particles having a size of about 5 microns or larger.

7 Claims, 4 Drawing Figures

FILTRATION PROCESS FOR SEPARATING PARTICLES FROM LIQUID COOLANTS IN LENS GRINDING DEVICES

BACKGROUND OF THE INVENTION

This invention is related to the separation of fine particles from a liquid coolant employed in a lens grinding process. More particularly, this invention is directed to a method and a filtration system for improved separation of the fine particles from the liquid coolant.

PRIOR ART

In the manufacture of lenses, a piece of lens-forming material, either glass or transparent plastic, is caused to come into contact with an abrasive disc to form a curved surface on the material in accordance with a prescription or specification.

Presently, two types of machines are used in forming lenses — generators and edgers. A generator is a machine used for grinding the front and back surfaces of a lens. As to an edger, this machine is for grinding the edge or perimeter of the lens so as to fit the lens to a particular frame selected by the customer.

In the generating or edging processes, because of the grinding operation, a liquid coolant is needed for lubrication purposes as well as for removing the heat generated by the frictional contact between the lens material and the abrasive disc. The coolant is usually delivered in the form of a continuous spray directed at the surface being formed. Furthermore, the coolant is generally stored in a container which is connected to a pumping means. After the coolant has been sprayed onto the lens material, it is allowed to flow into the storage tank where it is drawn into the input port of the pumping means and circulated to the lens material again.

The grinding operation creates fine particles of the lens material and removes some of the abrasives from the abrasive disc. These particles are introduced into the liquid coolant. The amount of such particles accumulated in the coolant increases with the number of lenses ground when the same batch of coolant is used. The presence of these particles in the coolant should be kept at a minimum since they may cause scratching of the surface of the lens being formed.

To alleviate the problems caused by a high accumulation of the fine particles in the coolant, most of the major manufacturers of lens generating or edging machines have suggested changing the coolant after a specific period of time or after a certain number of lenses has been formed with the same batch of coolant. The proposed number of lenses formed is 300 to 400 lenses, whereas the suggested period of time is two weeks. For example, according to the instruction manuals, and repair guide for edgers (edging machines) manufactured by Shuron, Lemay and AIT Industries, the operator of the machine is to change the coolant after 300 – 400 lenses have been formed. In the edgers made by Shuron and AIT Industries, the coolant is stored in a container lined with a bag formed of a non-porous material, such as polyethylene. When it is necessary to change the coolant, the used coolant and the bag are replaced. It must be noted that the above manufacturers who are three of the five major manufacturers of lens making machines in the world, do not suggest the use of a filter to separate the particles from the coolant nor are filters provided by the manufacturers. They merely suggest that the coolant be changed periodically. Furthermore, the use of polyethylene bags is undesirable for the following reason. When replacing the coolant, both the bag and the coolant are disposed of. The disposal of these wet bags must be conducted with care since such bags have been known to form methane gas at landfills, thus causing harm to the environment.

Despite the failure of the manufacturers to provide filters, users of the machines have used filters to separate the particles from the coolant. For example, in the lens forming process utilized by Bausch & Lomb, one of the major producers of lenses in this country, filter bags made of cotton duck, a woven fabric, with a napped surface are used. Upon its return to the storage tank, the coolant flows through the filter bag prior to being pumped back to the grinding chamber. The bags are efficient in removing approximately 50% of the particles. An operator has to remove, manually, the particles which have not been collected by the filter. This manual cleaning procedure is not only time consuming, but also exposes the operator to a health hazard, since the fine particles may be difficult to remove from a person's skin because of their small size. The above discussion clearly shows that there is a present and urgent need for an efficient filter system for use in connection with lens forming processes.

On the other hand, it is noted that the use of a filter medium in cutting tool coolant supply system is known, as exemplified by the following references.

U.S. Pat. No. 2,364,418 discloses a grinding machine having oil as the cooling medium. To insure the delivery of a clean coolant to the grinding wheel and the work, this patent teaches the use of a filter unit consisting of a pail partially filled with small rhomboidal or lozenge-shaped cast iron pieces or with crushed stone, with crushed stone being preferred. The use of a non-woven fabric as the filtration medium has not been mentioned in this patent.

U.S. Pat. No. 2,671,561 discloses a sediment removing and filtering apparatus for machine tools such as lathes, grinders and shapers. According to this patent, the coolant is fed into a tank having baffle walls at the entrance and exit ports thereof to prevent the sediment from being discharged therefrom. An endless conveyor belt transverse the bottom wall portion of the tank to remove the sediment. However, it is noted that this patent does not teach the utilization of a non-woven fabric as a filter medium.

U.S. Pat. No. 2,765,916 is directed to a filtering means for removing scrap and suspended solids from a liquid such as cutting oil or coolant used in a machine. A strainer means such as a screen or a perforated sheet metal is used for filtering the coolant. The use of non-woven fabrics as a filtering means is not disclosed in this patent.

U.S. Pat. No. 3,341,983 discloses an apparatus for continuously clarifying machine tool coolants. The apparatus taught in this patent includes a vortex separator wherein the differential in the flow velocity of the coolant is used to remove the particles. This patent does not teach the use of a filtering medium.

U.S. Pat. No. 3,455,457 discloses a filtering device for contaminated liquid coolant from a machine tool. The filter unit disclosed in this patent comprises a cartridge made of cellulose fibers impregnated with resin, the fibers being bonded in position by the resinous impregnation and polymerization. In addition, stainless steel mesh cartridges may also be used as the filter unit. It is noted that the cellulosic filter, as shown at column 2, lines 53 through 57 of this patent, has an initial degree of filtration as low as 5 microns. As to the stainless steel mesh cartridge, the initial degree of filtration can be as low as 1 micron, as indicated at column 2, lines 57 through 60.

U.S. Pat. No. 3,651,607 discloses a self-contained waste collector usable in a manufacturing operation. A filter bag is used for separating the shavings. It is taught in this patent that the filter bag is made of cloth or similar disposable material.

U.S. Pat. No. 3,830,373 is directed to a drainage tube with a restraining screen. The screen may be fabricated of spun bonded filamentary material. As indicated at column 2, lines 32 through 38 of this patent, the screen is for preventing waterborne particles above a particular size from entering the tube.

U.S. Pat. No. 3,841,488 discloses an oscillating strainer for a cutting tool coolant supply system for a machine tool. A screen is utilized as the strainer. The use of a fabric as a filtering medium is not taught in this patent.

From the above discussion, it is clear that filters are used in machine tools for separating particles or shavings from the coolant. The filters employed are usually made of cloth or a metal screen. However, it must be noted that the use of a filter made of a non-woven fabric in a lens generating or edging process has never been disclosed or suggested in the above-cited references.

SUMMARY OF THE INVENTION

The present invention provides a method whereby the fine particles entrained in the liquid coolant in a lens generating or edging device can be efficiently and economically removed prior to the return of the cleaned liquid coolant to the grinding chamber without exposing the operator to any health hazards.

According to the present invention, the entrained fine particles can be separated at a substantially increased efficiency by passing the liquid coolant through a filter medium made of a non-woven fabric comprising synthetic filaments having a denier of from about 3.5 to about 5.0, the fabric having a density of from about 0.3 oz. to about 2.0 oz. per square yard, the reduction in the liquid coolant flow rate caused by the filter medium being less than 1% wherein a cake of the particles is formed on the surface of the medium into which the coolant enters to provide an effective filter system.

DETAILED DESCRIPTION OF THE INVENTION

Figure 1:
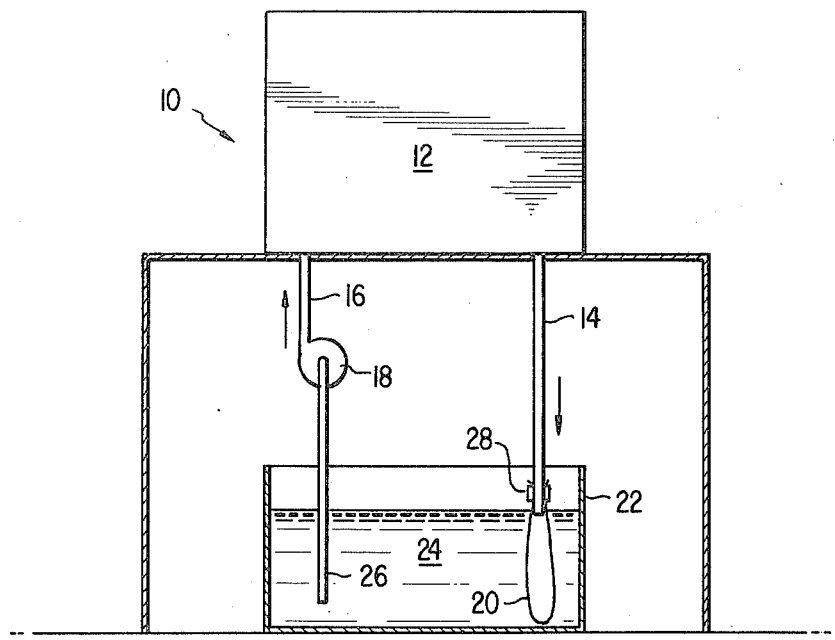
FIG. 1 shows a lens grinding system wherein the present invention is applied.

It has been found that non-woven fabrics having specific physical characteristics are highly efficient in separating fine particles from the liquid coolant in lens generating or edging processes.

According to the present invention, the contaminated or particle-carrying coolant in a lens generating or edging process is passed through a filtration system having particular physical characteristics to separate, with high efficiency, the particles created by contacting a lens material with an abrasive disc and deposited in the liquid coolant. After the filtration step, the cleaned coolant is circulated back to the grinding chamber. In general, the grinding chamber comprises a grinding or abrasive disc, a clamping means for the lens material, a driving means for the abrasive disc and a drainage pan into which the liquid coolant, after having been sprayed onto the work, can flow. The grinding chamber is usually an enclosed area so as to prevent the introduction of fine powders of the lens material into the surrounding atmosphere.

The present invention is applicable to lens generating or edging devices wherein a liquid coolant is used as a lubricant as well as for removing heat produced by the grinding process. The coolant is sprayed onto the work (the lens being ground) and drained into a storage tank. The coolant is then delivered to the work by means of a pump.

As a result of the research conducted by the inventor, it was found that while woven filter fabrics generally have an efficiency of about 50%, non-woven fabrics have a much higher efficiency. For particles having a size of 5 microns or larger, it was found that by using the method of the present invention, approximately 97% to 99% of the particles were removed. For particles smaller than 5 microns, approximately 75% to 80% were removed after the first passage of the coolant through the filter. However, after several passages of the coolant, a layer or cake of the particles was formed on the inlet surface of the filter to improve the efficiency thereof. Consequently, the removal of particles smaller than 5 microns approached 97% to 99% after the build-up of the cake.

Suitable non-woven fabrics include those made of synthetic filaments, such as polyamide, polyester, polyacetate, polyolefin and polyurethane. Among these, polyamide and polyester are preferred, with polyamide being most preferred.

The non-woven fabrics suitable for application in this invention should possess the following physical properties:

(a) Denier: The filaments of the fabric should range from about 3.5 to about 5.0 denier, with 3.5 being preferred;

(b) Density: from about 0.3 to about 2.0 oz. per square yard, with from about 0.5 to about 1.5 oz. per square yard being preferred, and 1.5 oz. per square yard being most preferred. The density of the fabric selected depends on the flow rate through the fabric, the higher flow rate, the lower the density; and (c) Reduction in coolant flow rate through the filter medium: less than about 1.0%. The filter medium should cause as low a reduction in flow rate of the coolant as possible, preferrably less than about 1.0%. A high reduction by the filter may cause the supply of the liquid coolant to be depleted, thus preventing delivery to the work, a highly undesirable result.

The above-listed requirements (a), (b) and (c) are of primary importance in the present invention. These requirements must be satisfied in order to achieve the results provided by this invention.

Among the numerous non-woven materials presently available in the market, two appear to be particularly suitable for the instant invention, viz, CEREX and REEMAY. CEREX is a spunbonded fabric manufactured by Monsanto and is composed of continuous filaments of NYLON 6,6. It is noted that the filaments in CEREX have a round cross-sectional configuration. This material has been known to be applicable in filtration processes. However, it must be noted that the use of CEREX as a filtration medium for the liquid coolant in a lens generating or edging process is unknown. As to REEMAY, it is a non-woven material composed of spunbonded polyester filaments having a tri-lobal cross-sectional configuration. Although REEMAY has been known to be useful in filtration processes, its application as a filtration medium for the liquid coolant in a lens generating or edging process is not known.

Furthermore, it should be noted that CEREX and REEMAY remain stiff even when wet, which facilitates replacement of the filter bags.

Figure 2:
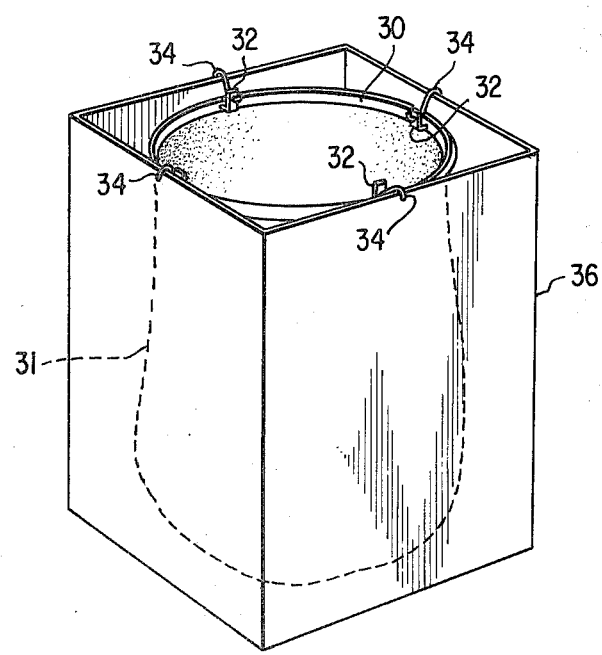
FIG. 2 shows a method of attaching a filter bag to a coolant container used in a lens grinding device.

With reference to the drawings, FIG. 1 illustrates how the present invention can be applied. In FIG. 1, 10 generally refers to a lens generating or edging device. The lens generating or edging device comprises a grinding chamber 12 having connected thereto one end of a drainage pipe 14 and the outlet port 16 of a pump 18. The other end of the drainage pipe is connected to a filter bag 20, the bag being located inside a storage tank 22 for a liquid coolant 24. The inlet port 26 of the pump is also connected to the storage tank. The liquid coolant 12, after having been sprayed onto the work, is permitted to flow into tank 22 by means of drain pipe 14. Attached to the end of the drain pipe is a filter bag 20 formed of a non-woven fabric. The bag may be secured to the drain pipe by means of a tie wire or a conventional hose clamp 28. The coolant flows through the filter bag leaving the fine particles entrapped therein. The coolant is then drawn into the inlet port 26 of pump 18 which delivers the substantially particle-free coolant to the grinding chamber 12. It is noted that although FIG. 1 shows that tank 22 is placed within the lens generating or edging device 10, the tank may be located outside the device, if necessary. In addition, instead of being attached to the drain pipe, the filter bag 31 may be clamped to a large circular ring 30, as shown in FIG. 2. The ring is provided with four lugs 32 through which S-hooks 34 are anchored for attaching the ring to a container 36. Container 36 can be of any shape, although a square one is shown in the drawing. The drain pipe from the grinding chamber is placed inside the bag whereas the inlet port of the pump is placed between the exterior of the bag and the interior of the container, when the lens generating or edging device is in use.

Figure 3:
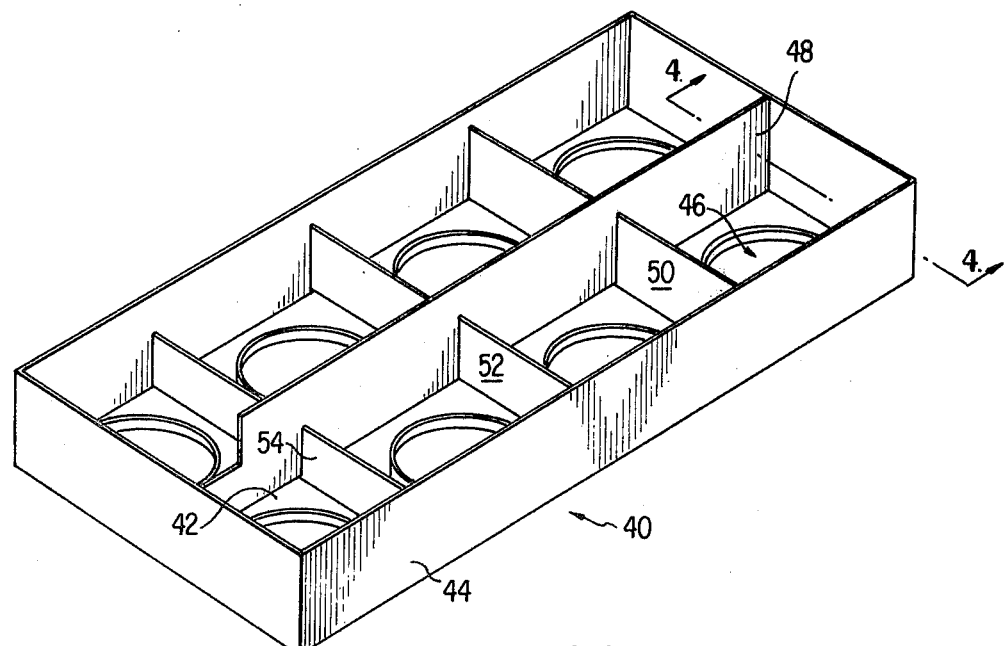
FIG. 3 shows a multiple filter bag tray which may be used in a lens grinding device.
Figure 4:
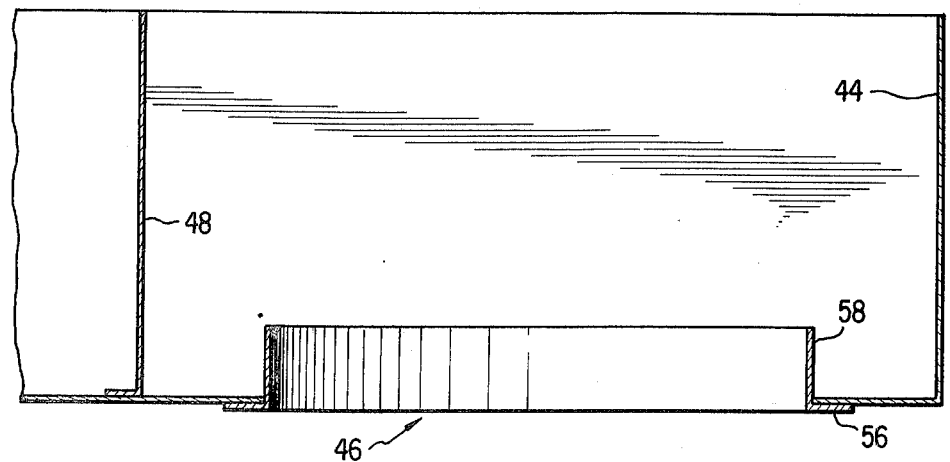
FIG. 4 shows a cross-sectional view along line 4—4' in FIG. 3.

FIGS. 3 and 4 show a device whereby a series of bags may be used. As shown in FIG. 3, a tray 40 is provided with a bottom wall 42 and for side walls 44 to form a box-like container with an open top portion. The bottom wall 42 is provided with a plurality of openings 46. It is noted that eight openings are shown in the drawing but any convenient number of openings can be used. Longitudinal partition wall 48 and lateral partition walls 50, 52 and 54 are provided to divide the tray into compartments, each having an opening in the center thereof. The partition walls 50, 52 and 54 have different heights, with wall 50 being the tallest and wall 54 the shortest.

As shown in FIG. 4, a circular flanged collar 56 is inserted into opening 46. The open end of a filter bag is inserted through opening 46 and folded over lip 58 of collar 56. A hose clamp or tie wire is then used to hold the bag tightly in place. Each of the openings is fitted with a filter bag as shown above.

When in use, the tray is placed on top of a container. Contaminated liquid coolant is fed into the compartment having the tallest partition wall. The filtered coolant is then pumped to the grinding chamber. As the bag becomes clogged after being in operation for a period of time, the liquid coolant overflows into the adjacent compartment until all of the bags in the tray are used. At that time, a new tray may be inserted or the individual bags fitted onto the used tray may be replaced.

Although it has been shown in the drawings that the filter medium is located between the drain pipe and the inlet port of the pumping device, the bag may be placed at other locations deemed convenient by one of ordinary skill in the art. For example, the filter medium may be located immediately below the grinding chamber, i.e. at the inlet of the drain pipe rather than at the outlet. As long as the contaminated coolant is passed through the filter medium prior to being sprayed onto the lens material in the grinding chamber, the results desired in this invention can be obtained.

The present filter medium which is effective in removing fine particles of lens materials such as glass and tranparent plastics, from the coolant, should be replaced every 600 lenses, at the maximum. Continued use of the coolant beyond 600 lenses may bring forth undesirable results, such as scratching of the lens.

At the present time, the liquid coolant used in most edgers comprises a water soluble coolant. As to generators, about 10% thereof use water soluble coolants, the remainder require oil based coolants. However, governmental regulations require that by 1985, water soluble coolants be used in all generators. The change from oil to water as the coolant is necessitated for safety reasons. In the grinding chamber, which is a substantially enclosed area, a small portion of the oil coolant exists in the form of a fine mist, as the result of the heat generated in the grinding operation. When the operator opens the cover to the grinding chamber upon the completion of a grinding process, the sudden availability of oxygen may cause the hot oil mist to flash, thus causing injury to the operator. As a result, in order to protect the operator, the government has ordered the changeover to water soluble coolants. The anticipated changeover should not have any effects on the applicability of the present invention since the filter medium used herein is effective in both water soluble and oil coolants.

The temperature at which the instant invention may be carried out is not particularly restricted, although most generating and edging processes are carried out at room temperatures (60° F. – 80° F.). The temperature range within which the instant invention is operative is from about 40° F. to about 400° F.

It has also been found that the pore size of the fabric has no effect on the efficiency of the filter medium.

It has also been found that the construction of the filter bag is not particularly restricted. As an example, a filter bag formed in the following manner has been found to be effective. A square or rectangle sheet of the non-woven fabric is folded along its center line. Two of the three edges so formed which comprise two layers of the fabric are folded with one layer overlapping the other, to a width of about 1 inch. The folds so formed are secured together by stitching to form a bag having an opening at one end and two sides sewn together. It should be noted that the above construction merely represents an example. Any other convenient method of forming the filter bags may be used.

The size or dimension of the filter bag can be varied. However, in order to facilitate safe handling and disposal, the bag should be of such a size that when filled it can be easily handled by an operator of average strength.

The inventor has also found that the high efficiency of the present invention can be obtained by passing the particle-carrying liquid coolant through a single layer of the filter medium only once. Additional layers of the filter medium and additional passes are not necessary. However, if the operator so desires, additional passes and layers may be used.

The present inventor believes that the high efficiency in separating the fine particles is due to the build-up of a layer or cake of the particles on the surface of the filter medium into which the contaminated or particle-carrying coolant flows. This cake serves as an additional filtering medium for the coolant, thus providing a filtration system with increased efficiency. It must be noted that the invention merely offers the above as a possible mechanism of the present invention. Such mechanism should not be interpreted as the only one possible nor does the inventor wish to be bound or limited thereto.

The present invention not only provides a highly efficient method of removing fine particles from liquid coolants, but also provides desirable results in the following areas:

(1) Cost. Filter bags of the present invention cost approximately ⅓ to 6/7 of that of woven cloth bags.

In addition, as a result of the increased filtering efficiency when using the present filter bags, the useful life of the abrasive disc is increased by at least 20%.

Most important of all, the savings incurred by the present invention lie in the significantly decreased length of time needed in replacing the used coolant. A decrease in labor cost as much as 90% can be achieved by using the present invention.

(2) Safety. In contrast to woven cloth filter bags where the fine particles can penetrate the fabric so as to accumulate on the outside surface, the present invention provides filter bags wherein substantially all of the particles are trapped on the interior surface thereof. Thus, an operator will not be exposed to the fine particles of glass or plastic if non-woven fabric is used to form the filter. A safer working environment for the operator is therefore obtained.

(3) Environmental consideration. As has been pointed out, non-woven polyethylene bags used for storing the used coolant are undesirable since they may generate methane gas when deposited in the wet form in a land fill, causing undesirable effects to the environment. In contrast, the non-woven material used in the present invention retains very little water and is not known to degenerate into harmful products upon disposal.

To illustrate the advantages of employing the present invention, the following example is included herein. The example is for illustrative purposes and by no means restrict the present invention.

EXAMPLE

A series of test runs were made with the following filter bags for lens edging devices.

Bag 1: Cotton duck
Bag 2: CEREX, 3.5 denier and a density of 1 oz/sq.yd.
Bag 3: CEREX, 3.5 denier and a density of 1.5 oz/sq.yd.

The results were summarized as follows:

| | Filtration efficiency of particles having diameter of 5 microns or larger | Time needed for replacing clogged bags |
|---|---|---|
| Bag 1 (Prior art) | 50% | 6 man-hours |
| Bag 2 | 97% | 1/20 man-hours |
| Bag 3 | 97% | 1/20 man-hours |

The results shown above clearly indicate that the present invention is highly efficient in particles removal (about 97%) as well as economical. The time needed to replace used coolants has been reduced to 1/120 of that of the prior art, which provides a sharp reduction in the costs incurred in forming the lens.

What is claimed is:

1. In a lens generating or edging process for shaping transparent plastic or glass lens material wherein the transparent plastic or glass lens is contacted with a rotating abrasive disc in the presence of a liquid coolant applied to the surface of a lens being ground by the abrasive disc to shape the lens and wherein as a result of said grinding fine particles of the transparent plastic or glass lens material are formed and are introduced into the liquid coolant, said fine transparent plastic or glass particles being objectionable because of their capability to scratch the lens material when the liquid coolant containing said fine particles comes into contact with a lens being formed by the abrasive disc and wherein the fine transparent glass or plastic particles are therefore subjected to filtration to separate the particles from the liquid coolant prior to the return of the liquid coolant to the grinding chamber, the improvement comprising removing substantially all of the fine transparent plastic or glass particles from the liquid coolant with improved efficiency to substantially completely eliminate the risk of scratching a lens during forming by passing the fine transparent plastic or glass particle-containing coolant through a filter bag made of a non-woven fabric comprising synthetic polyester or polyamide filaments having a denier of from about 3.5 to about 5.0, the fabric having a density of from about 0.3 to about 2.0 ounces per square yard, the reduction in the liquid coolant flow rate caused by the filter material being less than about 1.0%, wherein a cake of the fine particles is formed on the surface of the filter medium, into which the coolant flows, to provide an effective filter system, said filter bag being effective to remove at least about 97% of said fine transparent plastic or glass particles having a size of 5 microns and larger and about 75–80% of fine particles smaller than 5 microns initially after the first passage of the coolant through the filter medium and after build-up of said cake of fine particles on the filter medium the removal of particles smaller than 5 microns approaches 97% to 99%.

2. The process of claim 1 wherein the synthetic filaments have a denier of about 3.5.

3. The process of claim 1 wherein the non-woven fabric has a density of from about 0.5 to about 1.5 oz. per square yard.

4. The process of claim 1 wherein the synthetic filaments are formed of a polyamide and have a circular cross-sectional configuration.

5. The process of claim 1 wherein the synthetic filaments are formed of a polyester and have a tri-lobal cross-sectional configuration.

6. The process of claim 1 wherein the non-woven fabric has a density of from about 0.5 to about 1.5 oz. per square yard and comprises polyamide filaments having a denier of about 3.5 and a circular cross-sectional configuration.

7. The process of claim 6 wherein the non-woven fabric has a density of about 1.5 oz. per square yard.

* * * * *